US010522037B1

(12) United States Patent
Batra et al.

(10) Patent No.: US 10,522,037 B1
(45) Date of Patent: Dec. 31, 2019

(54) PARKING AVAILABILITY MONITOR FOR A NON-DEMARCATED PARKING ZONE

(71) Applicant: Verizon Patent and Licensing Inc., Arlington, VA (US)

(72) Inventors: Udit Batra, Fremont, CA (US); Ilker Ozsaracoglu, San Jose, CA (US); Kasiana J P McLenaghan, New York, NY (US); David L. Tucker, Saratoga, CA (US); Mohammad Naimur Rahman, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/202,824

(22) Filed: Nov. 28, 2018

(51) Int. Cl.
*G08G 1/14* (2006.01)
*G06K 9/00* (2006.01)
*G08G 1/065* (2006.01)

(52) U.S. Cl.
CPC .......... *G08G 1/144* (2013.01); *G06K 9/00812* (2013.01); *G06K 9/00825* (2013.01); *G08G 1/065* (2013.01); *G08G 1/14* (2013.01); *G08G 1/141* (2013.01); *G08G 1/143* (2013.01); *G08G 1/145* (2013.01); *G08G 1/147* (2013.01); *G08G 1/149* (2013.01)

(58) Field of Classification Search
CPC .......... G08G 1/065; G08G 1/14; G08G 1/141; G08G 1/143; G08G 1/144; G08G 1/145; G08G 1/147
See application file for complete search history.

(56) References Cited

U.S. PATENT DOCUMENTS

| | | | | |
|---|---|---|---|---|
| 9,595,194 B1 * | 3/2017 | Tuxen | ..................... | G08G 1/143 |
| 9,847,027 B2 * | 12/2017 | Nordbruch | ............. | G08G 1/141 |
| 2009/0088959 A1 * | 4/2009 | Mori | ..................... | G08G 1/0104 |
| | | | | 701/118 |
| 2014/0375804 A1 * | 12/2014 | Bulan | ...................... | H04N 7/18 |
| | | | | 348/148 |
| 2015/0124093 A1 * | 5/2015 | Wang | ................. | G06K 9/00812 |
| | | | | 348/148 |

* cited by examiner

*Primary Examiner* — Andrew W Bee (57) ABSTRACT

An example method described herein includes receiving an image stream of a non-demarcated parking zone; identifying dimensions of the non-demarcated parking zone; determining an overall area of the non-demarcated parking zone based on the dimensions of the non-demarcated parking zone; calculating a capacity of the non-demarcated parking zone based on the dimensions of the overall area and predetermined vehicle dimensions; determining a number of vehicles parked in the non-demarcated parking zone based on the image stream and an object detection model, wherein the object detection model is configured to detect vehicles in the image stream that are parked in the non-demarcated parking zone; determining a parking availability of the non-demarcated parking zone based on the number of vehicles parked in the non-demarcated parking zone and the capacity; and performing an action associated with the parking availability.

20 Claims, 8 Drawing Sheets

PARKING AVAILABILITY MONITOR FOR A NON-DEMARCATED PARKING ZONE

BACKGROUND

A parking zone is an area that is designated or intended for vehicle parking. A parking zone can be situated in urban areas and/or rural areas along streets and/or near destinations such as, places of business, recreational areas, industrial parks, churches, schools, and/or other similar venues. In some instances, a parking zone can include one or more security devices (e.g., cameras, sensors, and/or the like) that monitor vehicle parking and/or authorize vehicle access to the parking zone (e.g., via a payment transaction, via an access card, and/or the like).

DETAILED DESCRIPTION OF PREFERRED EMBODIMENTS

The following detailed description of example implementations refers to the accompanying drawings. The same reference numbers in different drawings can identify the same or similar elements.

Depending on a location of a parking zone and/or a time of the day, the parking zone can be very busy and can potentially be at or near capacity. Accordingly, in many instances, a driver can spend an extended period of time trying to find available parking within the parking zone. During that extended period of time, the driver can travel in a vehicle throughout the parking zone and/or along parking zones that are on the streets, seeking available parking locations. Such time and travel can waste valuable resources of the driver and/or the vehicle. In some instances, when parking zones include demarcated parking spots (e.g., allocated and/or marked locations or spaces of a parking zone where the vehicle can be parked), a parking system and/or application can be available to indicate available parking of a particular parking zone. The parking system and/or application can use markings (e.g., painted lines, signs, markers, reflectors, and/or the like) to identify the parking spots in the parking zone. Accordingly, if a vehicle is detected within or near the markings of a parking spot, the parking system and/or application can determine that the parking spot is occupied and if no vehicle is detected within or near the markings of the parking spot, the parking system and/or application can determine that the parking spot is vacant or available.

However, a parking zone might not include markings to allocate specific locations intended for individual vehicles. Such a parking zone is referred to herein as a non-demarcated parking zone. Although the non-demarcated parking zone can be marked as a parking zone, the non-demarcated parking zone does not include markings for individual parking spots for individual vehicles. A non-demarcated parking zone can include a street parking area along a curb or shoulder of a street, a non-demarcated parking lot, a temporary parking lot (e.g., parking lots created for specific lengths of time or events), such as a field or grassy area, and/or the like. As such, for a non-demarcated parking zone, previously available parking systems or applications cannot determine parking availability of the non-demarcated parking zones because there are no markings to identify the allocated parking locations in the parking zones.

Some implementations herein provide a parking system that facilitates identifying and/or providing parking availability in non-demarcated parking zones. For example, the parking system can monitor a non-demarcated parking zone (e.g., via an image stream from a camera focused on the non-demarcated parking zone), determine a size of an area of the non-demarcated parking zone, determine a size of an occupancy area consumed by one or more vehicles, and calculate an available area of the non-demarcated parking zone to determine whether there is an available parking space within the non-demarcated parking zone and/or a probability that there is an available parking space within the non-demarcated parking zone. In some implementations, the parking system can use historical data associated with the non-demarcated parking zone to estimate and/or predict parking availability based on the historical data, characteristics of the non-demarcated parking zone, and/or characteristics of a vehicle that a driver is seeking to park in the non-demarcated parking zone.

In some implementations, the parking system can identify and/or provide a best available parking area of a non-demarcated parking zone and/or a best available parking zone of a plurality of non-demarcated parking zones for a vehicle based on a destination associated with the vehicle. For example, the destination associated with the vehicle can be a location indicated by an address entered in a global positioning system (GPS) of the vehicle or an address entered into a device associated with the vehicle (e.g., via an application, such as a parking application used to communicate with the parking system, a navigation application, a map application, and/or the like). In such cases, the parking system can navigate the driver to the best available parking area of the non-demarcated parking zone.

Accordingly, examples herein can provide a parking system that enables a vehicle and/or a driver of a vehicle to relatively quickly identify available parking in a non-demarcated parking zone, thus saving user and vehicle resources (e.g., fuel, mileage, usage, maintenance, and/or the like).

Figure 1A:
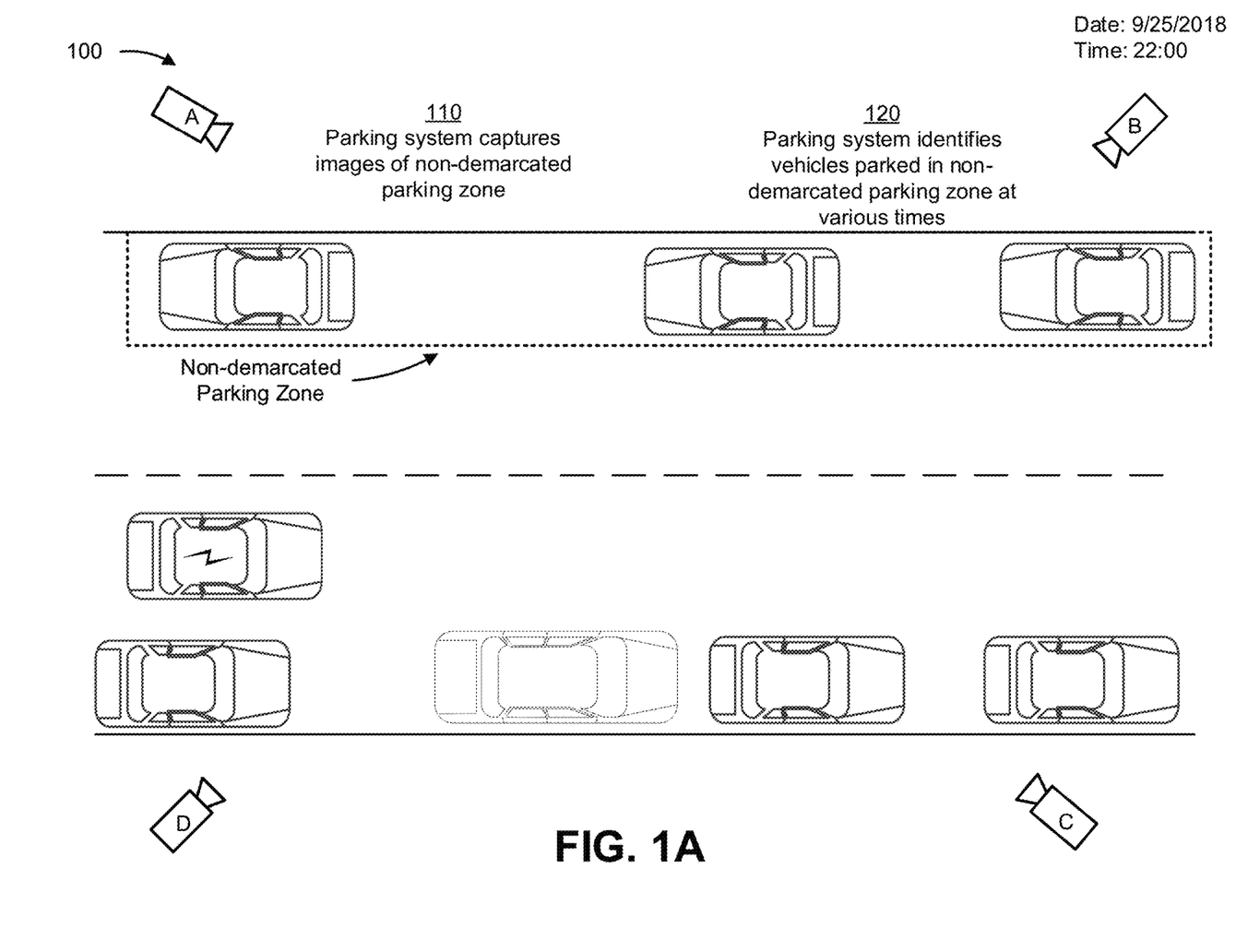
FIG. 1A-1C are diagrams of an example implementation described herein.
Figure 1B:
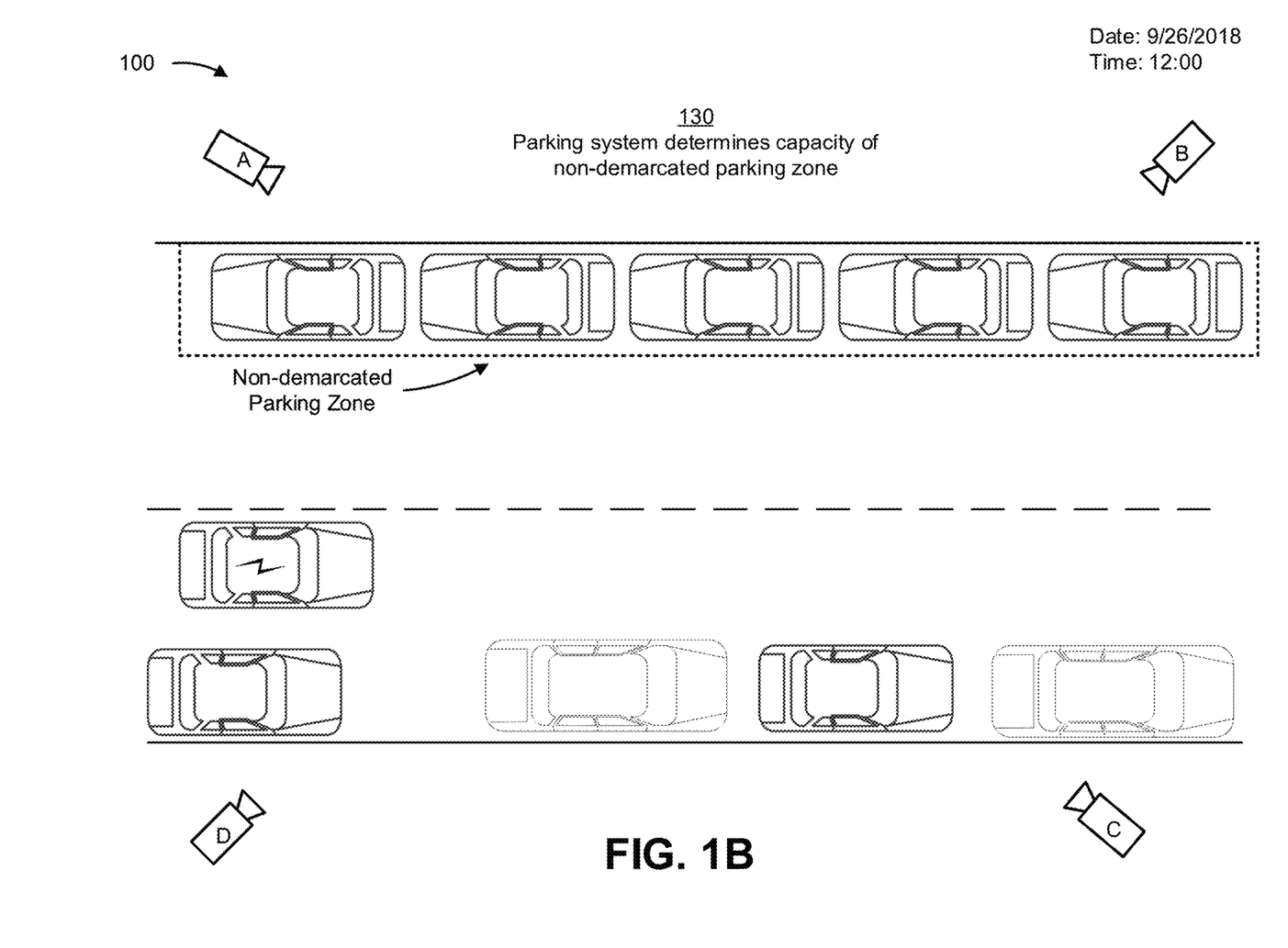
Figure 1C:
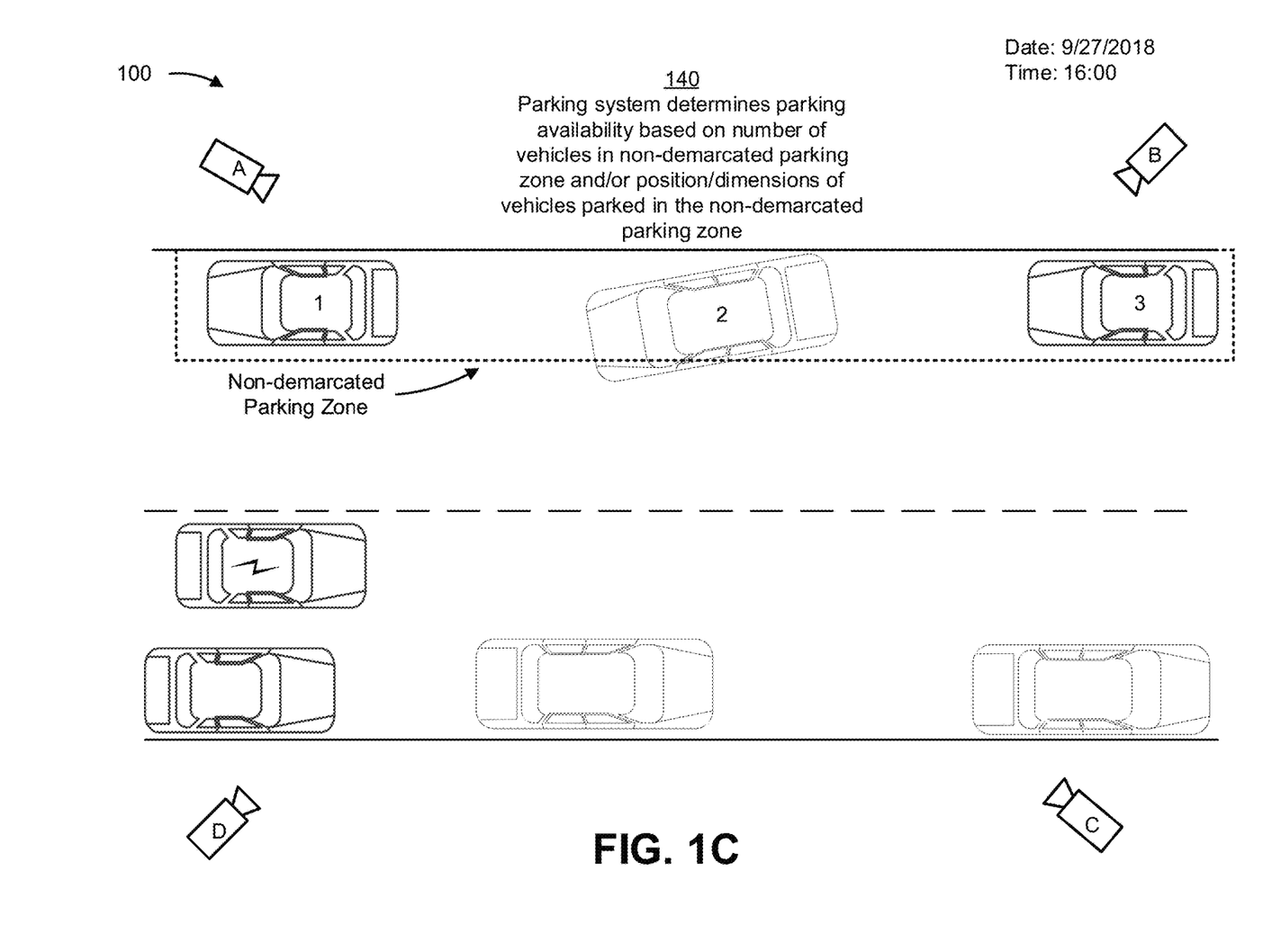

FIGS. 1A-1C are diagrams of an example implementation 100 described herein. In example implementation 100, a parking system can identify parking availability of a non-demarcated parking zone positioned along an edge of a street. As shown in FIGS. 1A-1C, the non-demarcated parking zone can include various numbers of vehicles, various types of vehicles, vehicles parked in various positions at different or various times. As described herein, the parking system can be configured to determine the parking availability at the various times based on the position and/or number of vehicles parked within the non-demarcated parking zone and a capacity of the non-demarcated parking zone. In some implementations, the parking availability can indicate whether there is availability for a vehicle to park in the non-demarcated parking zone and/or a probability that the vehicle can park in the non-demarcated parking zone.

As shown in FIG. 1A, and by reference number 110, a parking system captures images of a non-demarcated parking zone. For example, cameras A-D can capture an image stream (e.g., a series or sequence of images, such as video) of vehicles parked in the non-demarcated parking zone. The image stream can be provided to a controller or processor of the parking system that is configured to analyze the image stream as described herein. In some implementations, cameras A-D can continuously provide the image stream (or video), can provide images or an image stream periodically or at particular time intervals, and/or based on detecting an event (e.g., a vehicle entering or leaving the non-demarcated parking zone).

As further shown in FIG. 1A, and by reference number 120, the parking system identifies the vehicles parked in the non-demarcated parking zone at various times. For example, as shown in FIG. 1A, cameras A-D can capture an image of three vehicles within the non-demarcated parking zone at 22:00 on 9/25/2018 and the system can detect the vehicles (e.g., using an object recognition technique, as described herein). In some implementations, the parking system can utilize sensors, security devices, and/or the like to detect the presence of a vehicle in the non-demarcated parking zone at the various times.

As shown in FIG. 1B, and by reference number 130, the parking system determines a capacity of the non-demarcated parking zone. In some implementations, the parking system can determine the capacity of the non-demarcated parking zone based on tracking a maximum number of vehicles detected within the non-demarcated parking zone over a time period. For example, the parking system can determine the most vehicles parked in the non-demarcated parking zone over a most recent time period (e.g., the most recent week, the most recent month, the most recent year, and/or the like), over a calibration time period (e.g., a week, a month, a year, and/or the like that the parking system monitored the non-demarcated parking zone), and/or the like.

In some implementations, the parking system can determine the capacity of the non-demarcated parking zone based on a size of the non-demarcated parking zone and a size (e.g., an average size and/or a default size) of a vehicle. For example, an area of the non-demarcated parking zone can be divided by an occupancy area of a vehicle plus some buffer area (e.g., a constant area) to allow for space between the parked vehicles in the non-demarcated parking zone. The occupancy area (and/or buffer area) can be calculated from predetermined dimensions of a vehicle. In some implementations, the predetermined dimensions can correspond to average dimensions of a set of vehicles. In such cases, the set of vehicles can be a set of vehicles that have been manufactured within a threshold time period (e.g., within the last year, with the last ten years, within the last one hundred years, and/or the like), a set of vehicles that are used in a geographic location of the non-demarcated parking zone, a set of vehicles that are top-selling vehicles in a geographic location of the non-demarcated parking zone, and/or the like. Additionally, or alternatively, the set of vehicles can be a set of vehicles that have parked in the non-demarcated parking zone over a past time period. For example, the parking system can analyze, using an image analysis (e.g., object recognition, object analysis, computer vision, and/or the like) of vehicles in images from the image stream, sizes (e.g., lengths) of the vehicles that have parked in the non-demarcated parking zone over the last week, the last month, the last year, and/or the like. The predetermined dimensions can include an average length of the vehicles that have parked in the non-demarcated parking zone over that time period. As such, the parking system can be adaptable to particular locations and/or demographic areas and, thus, more accurate in its calculations. For example, a non-demarcated parking zone in a rural area can be more likely to include larger vehicles, such as pickup trucks or work machines, while a non-demarcated parking zone in an urban area can be more likely to include smaller vehicles, such as sedans or compact cars. Furthermore, using a set of vehicles that have parked in the non-demarcated parking zone, the parking system can use an automatically adjustable occupancy area to determine the capacity of the non-demarcated parking zone. Furthermore, the parking system can be deployed without any calibration, and can automatically determine a capacity of a particular non-demarcated parking zone based on the sizes of vehicles that are likely to be parked in the non-demarcated parking zone.

The parking system can determine the size of the non-demarcated parking zone based on one or more dimensions (e.g., length and/or width) of the non-demarcated parking zone. For example, the parking system can calculate the area using a determined length and width of the non-demarcated parking zone. In some implementations, the parking system can determine the size of the non-demarcated parking zone from a single dimension. For example, for a non-demarcated parking zone along the side of a road (as shown in implementation 100), the parking system can determine the size of the non-demarcated parking zone based on the length of the road, a distance between intersections of the road, and/or the like. In some implementations, the parking system can identify non-available parking areas of the non-demarcated parking zone. For example, there can be areas of the non-demarcated parking zone that are near a fire hydrant, a driveway, an intersection, and/or the like. The parking system can identify such areas using an image and/or an object recognition technique to identify the non-available parking areas and/or objects or markers associated with the non-available parking areas.

In some implementations, the parking system can obtain one or more coordinates (e.g., geolocation coordinates) of the non-demarcated parking zone. The one or more coordinates can correspond to edges and/or corners of the non-demarcated parking zone. Based on the coordinates, the parking system can calculate an area (e.g., an overall area) of the non-demarcated parking zone (e.g., using any suitable geometric calculation). In some implementations, the one or more coordinates can correspond to coordinates of streets and/or intersections that bound the non-demarcated parking zone. In some implementations, the parking system can obtain the coordinates via a user input and/or during a calibration phase when the parking system is configured to monitor the non-demarcated parking zone. Using coordinates can be more accurate in determining a shape of the non-demarcated parking zone (e.g., especially if the non-demarcated parking zone has an irregular shape).

Additionally, or alternatively, the parking system can determine the coordinates based on coordinates of one or more markings (e.g., parking signs, no-parking signs at ends of the non-demarcated parking zone, and/or the like) identifying the non-demarcated parking zone. For example, the parking system can determine the dimensions of the non-demarcated parking zone based on an image analysis (e.g., an object recognition analysis, a landscape analysis, and/or the like) of the image stream. For example, an image analysis can be performed to determine one or more dimensions of the non-demarcated parking zone based on markings (e.g., parking signs or no parking signs) identifying the location of the non-demarcated parking zone. Accordingly, in such cases, the parking system can automatically detect the location and/or size of the non-demarcated parking zone without any user interaction. For example, using the image analysis and/or a determined location of one or more of cameras A-D, a user might not need to provide the parking system with coordinates of the non-demarcated parking zone, a location of the non-demarcated parking zone, and/or the like to permit the parking system to determine or identify the coordinates of the non-demarcated parking zone. In some implementations, during a calibration stage markers can be set (e.g., by a user) to indicate borders of the non-demarcated parking zone so that the parking system can identify the borders of the non-demarcated parking zone.

In some implementations, the parking system can use an image analysis to identify one or more objects that designate "no parking" zones. For example, the parking system can identify a fire hydrant adjacent a non-demarcated parking zone along the side of the road. As such, the parking system can determine that an area within a threshold distance of the fire hydrant is not to be designated as part of the non-demarcated parking zone, and thus not to be included in the overall area of the non-demarcated parking zone. Additionally, or alternatively, the parking system can identify rules associated the with non-demarcated parking zone (e.g., "no parking on Sundays," no parking between "5 am and 9 am," and/or the like). Such rules can be received via a user device and/or identified based on an image analysis of one or more signs posted near the non-demarcated parking zone. In some implementations, third party platforms can be accessed in accordance with the rules. For example, if there is a "no parking, snow plow zone" rule, the parking system can obtain information from a weather platform to determine whether there was snow in the forecast or whether snow fell recently.

Referring to implementation 100 of FIG. 1B, the parking system can determine from one or more of the above example techniques that the capacity of the non-demarcated parking zone is five vehicles. Accordingly, as shown in FIG. 1B, at 12:00 on 9/26/2018 the parking system can determine that there is no parking availability in the non-demarcated parking zone because the parking system can detect five vehicles within the non-demarcated parking zone.

As shown in FIG. 1C, and by reference number 140, the parking system can determine parking availability based on a number of vehicles in the non-demarcated parking zone and/or a position or dimensions of the vehicles parked in the non-demarcated parking zone. For example, as shown in FIG. 1C, although, on 9/27/2018 at 16:00, only three vehicles (shown as vehicle 1, vehicle 2, and vehicle 3) are parked in the non-demarcated parking zone, the parking system can determine that there is no parking availability due to the size and/or position of vehicle 2. In FIG. 1C, because vehicle 2 is larger than the average vehicle and/or parked at an angle relative to the edge of the non-demarcated parking zone (and, thus, taking up more length of the non-demarcated parking zone than if the vehicle were parallel to the edge of the non-demarcated parking zone) there might not be enough space between vehicle 2 and vehicle 1 or between vehicle 2 and vehicle 3.

In some implementations, the system can use vehicle information to determine a distance between the vehicles. For example, the parking system can identify make/model of the vehicle to determine the size of the vehicles in the image. Using the size of the vehicles for scale, the parking system can then determine a distance between the vehicles. Additionally, or alternatively, the parking system can use landmarking. For example, the parking system can use markings on a street, a location of an object adjacent the non-demarcated parking zone (e.g., a tree, a house, a driveway, a sign, and/or the like) and known distances to the object to estimate the distance between the vehicles based on the position of the vehicles relative to the object.

In some implementations, the parking system can use a machine learning model, which can be referred to herein as object detection model, to detect vehicles in the non-demarcated parking zone. For example, parking system can train the object detection model based on one or more object detection parameters associated with detecting a vehicle in an image, such as a shape of a vehicle, a type of a vehicle, a size of a vehicle, a motion of a vehicle, an outline of a vehicle, a resolution of an image that includes a vehicle, a contrast of an image that includes a vehicle, lighting of the image, brightness of the image, and/or the like. The parking system can train the object detection model using historical data associated with detecting vehicles in the non-demarcated parking zone according to the one or more object detection parameters. Using the historical data and the one or more object detection parameters as inputs to the object detection model, the parking system can detect vehicles in the non-demarcated parking zone to determine a number and/or position of the vehicles in the non-demarcated parking zone.

In some implementations, the parking system can determine parking availability based on a determined distance between detected vehicles in the non-demarcated parking zone. For example, using an image analysis of the image stream, the parking system can calculate a distance between vehicles in the non-demarcated parking zone. In such cases, if the distance less a constant buffer to allow for room between the vehicles is greater than an average dimension (e.g., a length or width) of a vehicle or a known dimension of a particular vehicle, the parking system can determine that there is parking availability. On the other hand, if the distance less the constant buffer to allow for room between the vehicles is less than or equal to the average dimension (e.g., a length or width) or the known dimension of the particular vehicle, the parking system can determine that there is no parking availability.

In some implementations, the parking system can determine whether there is availability for a particular vehicle (or user of a particular vehicle) that is seeking to park in the non-demarcated parking zone. For example, if the parking system identifies that a vehicle is a relatively smaller vehicle (e.g., a compact car), the parking system can determine that there is parking availability for that particular vehicle. For example, the parking system, based on the smaller dimensions of the particular vehicle, can determine that the vehicle can fit between vehicle 2 and vehicle 1 and/or between vehicle 2 and vehicle 3. On the other hand, if the parking system identifies that a particular vehicle is a relatively larger vehicle (e.g., a pickup truck or sport utility vehicle (SUV)), the parking system can determine that there is no parking availability for the particular vehicle. In such cases, the parking system can identify the vehicle based on a user input, based on an identifier (e.g., a type, a model, a vehicle identification number (VIN), and/or the like) of the vehicle, based on the parking system being associated with the particular vehicle (e.g., installed within the particular vehicle), and/or the like.

In some implementations, parking system can use a machine learning model, which can be referred to herein a parking availability model, to determine the parking availability of a vehicle. For example, the parking system can train the parking availability model based on one or more availability parameters associated with determining the parking availability, such as a size of a vehicle, a size of the non-demarcated parking zone, a location of the vehicle, an estimated time of arrival of the vehicle, a type of the vehicle (e.g., make, model, utility, and/or the like), and/or the like. The parking system can train the parking availability model using historical data associated with determining the parking availability of a non-demarcated parking zone for the vehicle according to the one or more availability parameters. Using the historical data and the one or more parameters as inputs to the machine learning model, the parking system can determine the availability to indicate whether the vehicle can park (or a user can expect to park) in the non-demarcated parking zone.

In some implementations, the parking availability can be represented by a probability that a vehicle would be able to park in the non-demarcated parking zone upon arrival and/or that the non-demarcated parking zone would include an open space to fit the vehicle. In some implementations, the probability is based on the positions of the vehicles in the non-demarcated parking zone (and the corresponding distances between the vehicles), a size of the vehicle that is to park in the non-demarcated parking zone, a type of the vehicle that is to park in the non-demarcated parking zone, a location of the non-demarcated parking zone, a location of the vehicle that is to park in the non-demarcated parking zone, an estimated time of arrival of the vehicle that is to park in the non-demarcated parking zone, historical data associated with vehicles parking in the non-demarcated parking zone at a time corresponding to the estimated time of arrival of the vehicle that is to park in the non-demarcated parking zone, and/or the like.

In some implementations, the parking system can store information associated with the non-demarcated parking zone in a data structure. For example, the parking system can store parking characteristics of the non-demarcated parking zone in a data structure as historical data. Accordingly, the parking system can generate or build a data structure of historical data associated with vehicles parking in the non-demarcated parking zone. As described herein, the data in the data structure can be used to determine parking availability and/or predict parking availability for a particular time period.

Accordingly, a parking system can determine parking availability of the non-demarcated parking zone of example implementation 100. In some implementations, the parking system monitor and/or be associated with hundreds, thousands, or millions of non-demarcated parking zones and/or capable of detecting hundreds, thousands, or millions of vehicles in the non-demarcated parking zones. Accordingly, the parking system can monitor such a large amount of data that it would not be possible for one or more human actors to monitor, comprehend, or determine a parking availability of the non-demarcated parking zones.

The parking system can use an image stream from one or more cameras to determine the parking availability. The image stream can be analyzed to determine the status of the non-demarcated parking zone, such as a number of vehicles parked in the non-demarcated parking zone, respective positions of the vehicles parked in the non-demarcated parking zone, sizes of the vehicles parked in the non-demarcated parking zone, distances between the vehicles parked in the non-demarcated parking zone, and/or the like. The parking system can estimate the parking system based on the status of the non-demarcated parking zone, the size of the non-demarcated parking zone, and/or the size of a vehicle that is to park in the non-demarcated parking zone. As such, the parking system can identify and/or indicate parking availability to a user and/or vehicle (e.g., via a display of the vehicle and/or via a user device of the user). In this way, the user can conserve time, fuel, and/or usage costs involved with identifying available parking in non-demarcated parking zones.

In some implementations, the parking system can also have access to demarcated parking zones. In such cases, the parking system can provide information associated with parking availability in both the demarcated parking zones and the non-demarcated parking zones. Accordingly, the parking system can indicate an optimal parking location for a vehicle or user based on the determined availability of the demarcated and/or non-demarcated parking zones. As such, the parking system can conserve fuel, wear and tear on vehicles searching for any type of parking.

As indicated above, FIGS. 1A-1C are provided merely as an example. Other examples are possible and can differ from what was described with regard to FIGS. 1A-1C.

Figure 2:
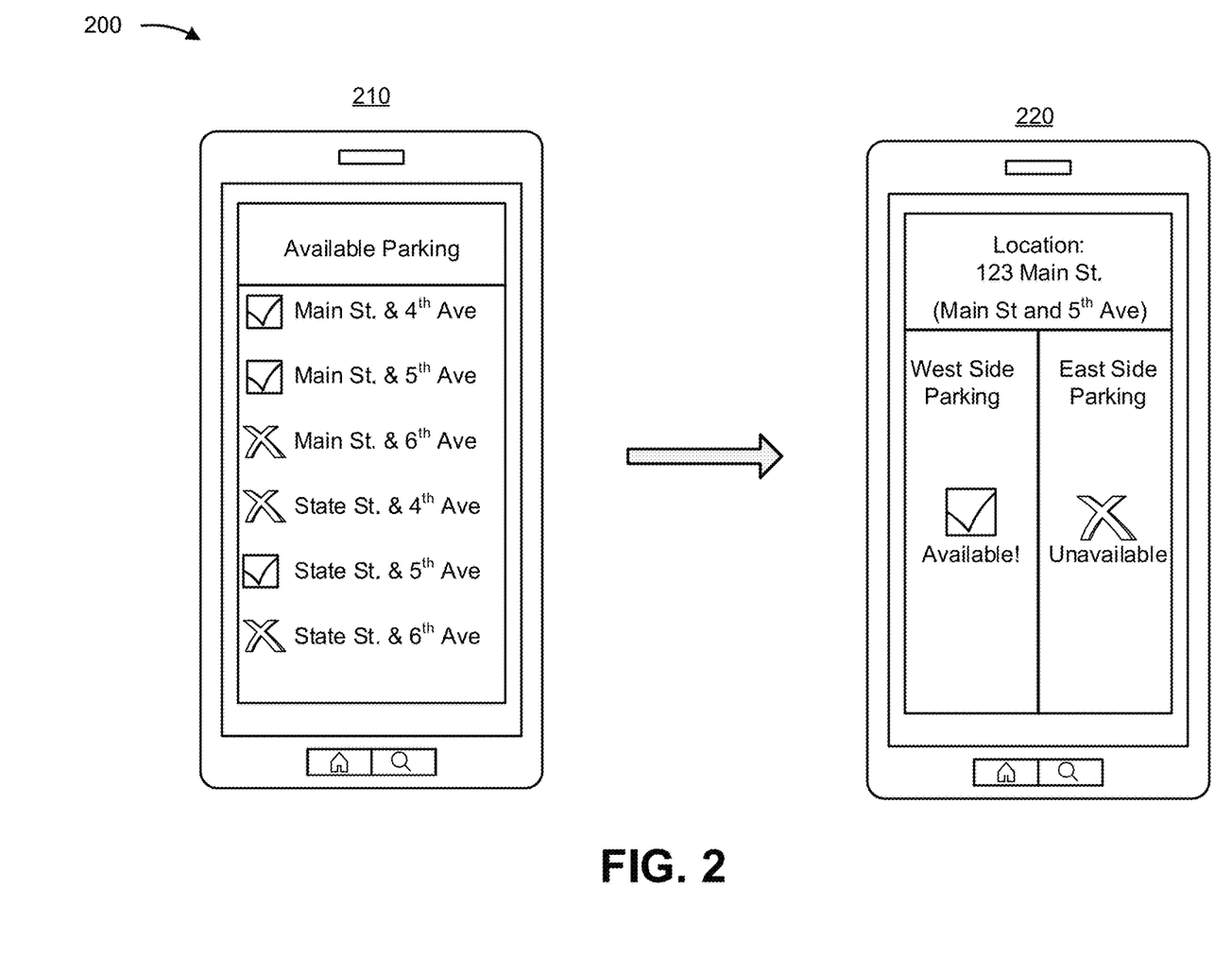
FIG. 2 is a diagram of an example implementation described herein.

FIG. 2 is a diagram of an example implementation 200 described herein. In the example implementation 200 of FIG. 2, a user interface (e.g., a graphical user interface) on a display of a user device provides parking availability of non-demarcated parking zones (e.g., in real-time). The user interface of FIG. 2 can be associated with the parking system (or an application of the parking system) of example implementation 100. For example, the parking system of example implementation 100 can utilize the user interface to provide parking availability to a user and/or to a vehicle.

As shown in FIG. 2 and by reference number 210, the user interface can list whether there is parking available within a plurality of non-demarcated parking zones and/or a plurality of demarcated parking zones on the user interface. The listed non-demarcated parking zones and/or demarcated parking zones can be non-demarcated parking zones within a threshold distance of the user device. As shown by the check marks, in example implementation 200, there is available parking in non-demarcated parking zones at Main St. and $4^{th}$ Ave, at Main St. and $5^{th}$ Ave, and State St. and $5^{th}$ Ave.

As further shown in FIG. 2, and by reference number 220, one of the non-demarcated parking zones can be selected to provide more detail on the parking availability. For example, Main St. and $5^{th}$ can be selected to show parking availability along Main St. Specifically, parking at 123 Main St. is indicated to be available on the west side of Main St. (but not on the east side of Main St.).

Accordingly, in some implementations, the parking system can determine and/or provide an address of the non-demarcated parking zone and/or an address of an open space of the non-demarcated parking zone. The parking system can determine the address based on mapping information and a position of a camera of the parking system. As such, the parking system, can determine, from the image stream, an address of the non-demarcated parking zone and/or an open space of the non-demarcated parking zone. In some implementations, the parking system can determine the address by identifying address information in the image stream. For example, the parking system can identify a street number of a building in the image and determine the address of the open space based on the street number of the building.

In some implementations, the parking system can provide navigation information to the user device to permit a user to navigate directly to the open parking space of the non-demarcated parking zone. The parking system can use any suitable navigation system to provide the navigation information to the user. Additionally, or alternatively, the navigation information can enable control of autonomous vehicles to arrive at the non-demarcated parking zone based on the parking availability. Furthermore, the autonomous vehicle can be controlled to park in an available location of the non-demarcated parking zone.

As indicated above, FIG. 2 is provided merely as an example. Other examples are possible and can differ from what was described with regard to FIG. 2.

Figure 3:
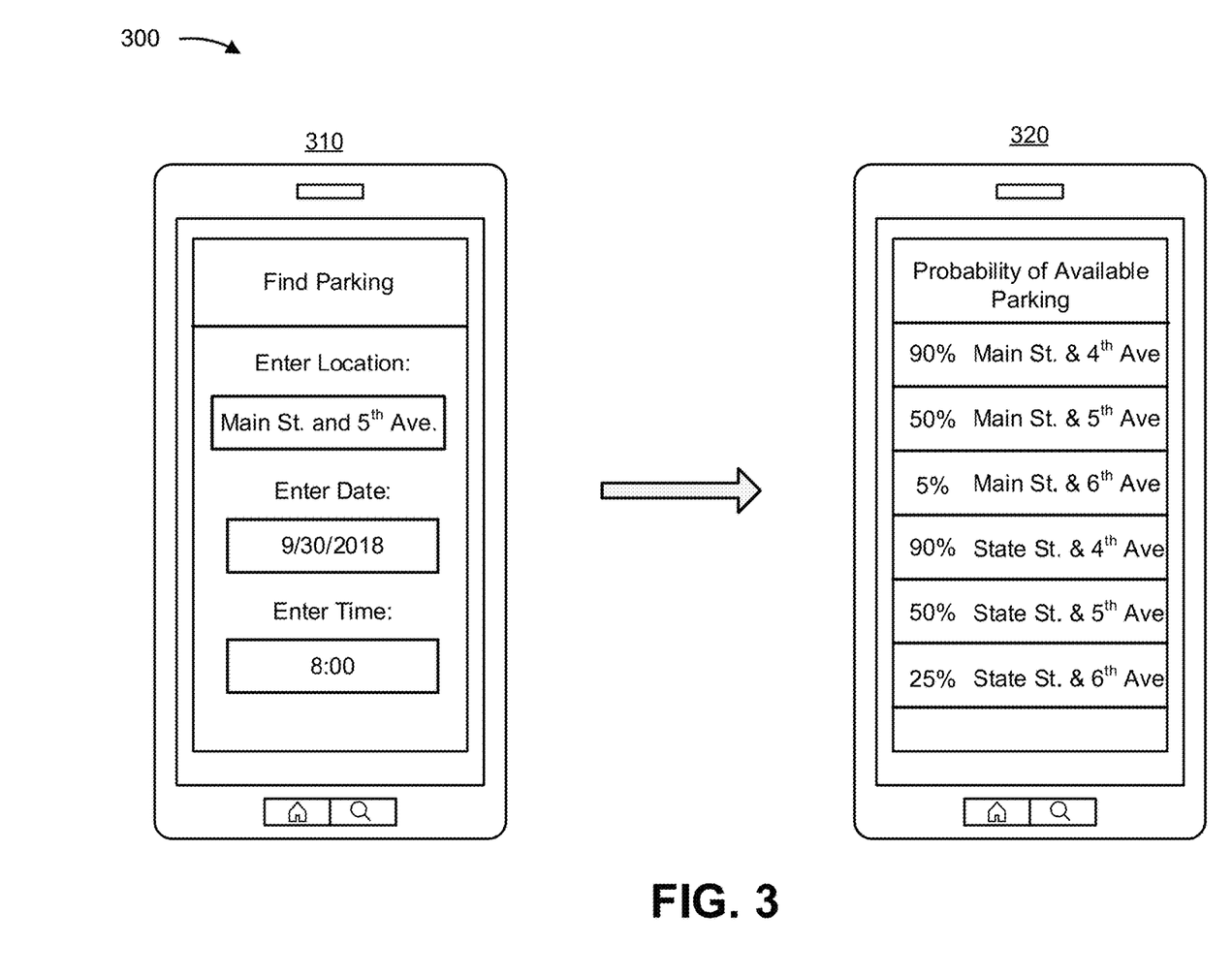
FIG. 3 is a diagram of an example implementation described herein.

FIG. 3 is a diagram of an example implementation 300 described herein. In the example implementation 300 of FIG. 3, a user interface (e.g., a graphical user interface) on a display of a user device is shown to enable a user to search or determine parking availability of a non-demarcated parking zone near a particular location at a particular date and/or time. Similar to the user interface of FIG. 2, the user interface of FIG. 3 can be associated with the parking system (or an application of the parking system) of example implementation 100 of FIG. 1.

As shown in FIG. 3, and by reference number 310, a user can enter a location (e.g., an intersection (as shown) and/or an address), a date, and a time. The parking system, as described above, can estimate the probability of the parking availability (the probability that parking will be available in non-demarcated parking zones near that location and at that time) based on historical data corresponding to that time and/or date.

As further shown in FIG. 3, and by reference number 320, the user interface shows the probability of available parking at non-demarcated parking zones. For example, there is a 90% chance of available parking at Main St. and $4^{th}$ Ave and a 5% chance of available parking at Main St. and $6^{th}$ Ave. The probabilities can be calculated from historical data corresponding to the date and/or time. For example, because 9/30/2018 is a Sunday and there is a church at Main St. and $6^{th}$ Ave., the parking system, over time, can determine that there is rarely parking available in the non-demarcated parking zone at Main St. and $6^{th}$ Ave. (because vehicles associated with church goers are in the non-demarcated parking zone). As such, the parking system can indicate via the user interface that there is a greater chance of finding parking at Main St. and $4^{th}$ Ave. (or any of the other non-demarcated parking zones).

Accordingly, using historical data associated with one or more non-demarcated parking zones, the parking system can indicate a probability that parking is available at the one or more non-demarcated parking zones at a particular time and/or date. Accordingly, a user and/or vehicle can head straight toward the non-demarcated parking zones that have a higher probability of being available at those times and/or dates, thus conserving time and/or vehicle resources, as described herein.

In some implementations, the probabilities that parking is available can be updated in real-time. For example, as the requested time for the requested parking availability nears, the probability can be updated periodically (e.g., every minute, every hour, and/or the like) and/or based on an event (e.g., a vehicle entering or leaving the non-demarcated parking zone).

Accordingly, as described herein, the parking system described above can enable a user and/or a vehicle to identify parking availability of a non-demarcated parking zone. As such, the user and/or the vehicle can more quickly determine where to park, thus saving time, fuel, and/or costs associated with searching for available parking in one or more non-demarcated parking zones.

As indicated above, FIG. 3 is provided merely as an example. Other examples are possible and can differ from what was described with regard to FIG. 3.

Figure 4:
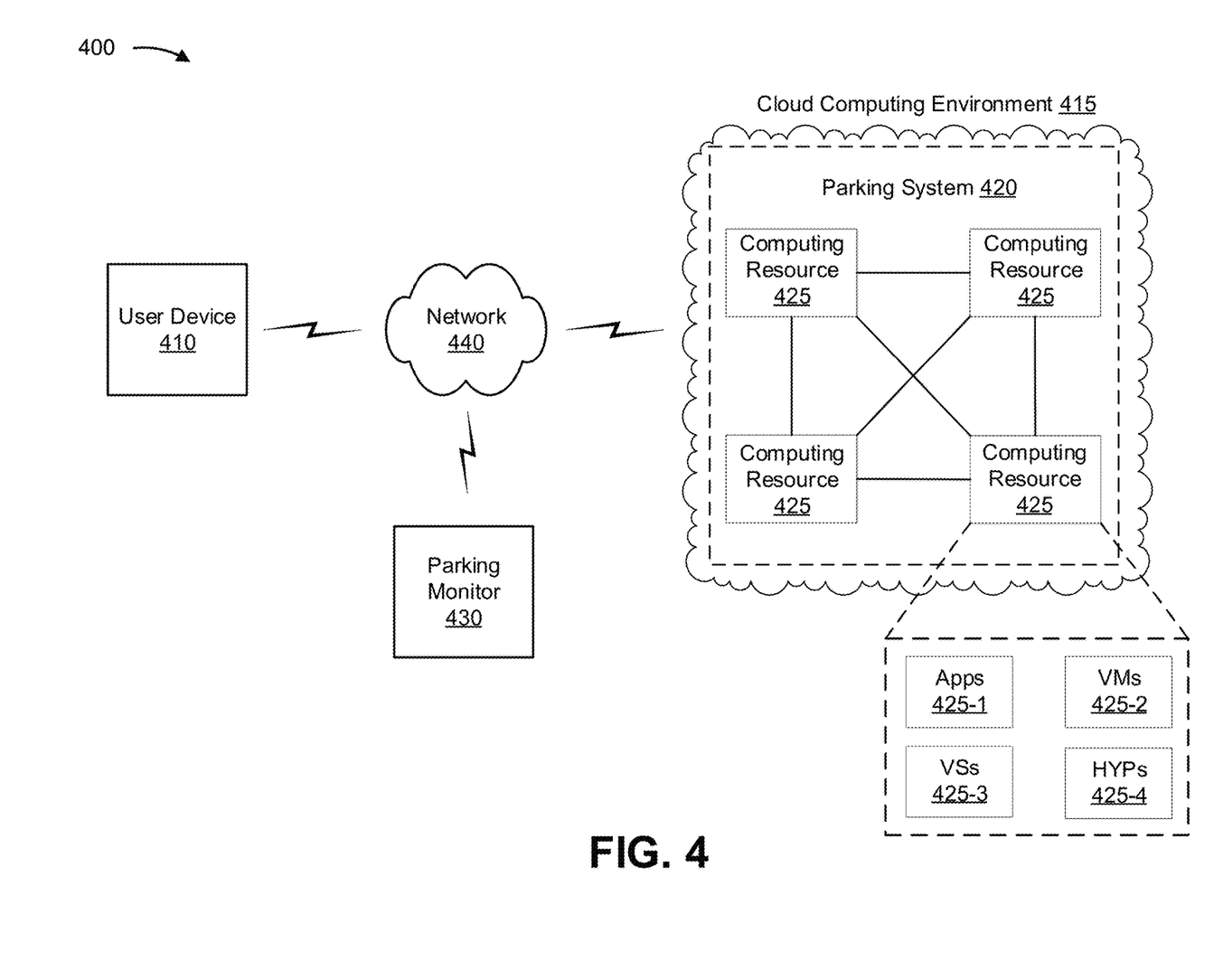
FIG. 4 is a diagram of an example environment in which systems and/or methods, described herein, can be implemented.

FIG. 4 is a diagram of an example environment 400 in which systems and/or methods, described herein, can be implemented. As shown in FIG. 4, environment 400 can include a user device 410, a parking system 420 hosted within a cloud computing environment 415, a parking monitor 430, and a network 440. Devices of environment 400 can interconnect via wired connections, wireless connections, or a combination of wired and wireless connections.

User device 410 includes one or more devices capable of receiving, generating, storing, processing, and/or providing information associated with identifying and/or indicating parking availability of one or more non-demarcated parking zones. For example, user device 410 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a control console of a vehicle, or a similar type of device.

Parking system 420 includes one or more computing resources assigned to determine and/or provide parking availability of one or more non-demarcated parking zones. For example, parking system 420 can be a platform implemented by cloud computing environment 415 that can receive and/or analyze an image stream of a non-demarcated parking zone, determine a capacity of the non-demarcated parking zone, determine a number of vehicles and/or a position of the vehicles in the non-demarcated parking zone, and/or determine the parking availability of the non-demarcated parking zone based on the capacity and/or the number and/or the position of the vehicles in the non-demarcated parking zone. In some implementations, parking system 420 is implemented by computing resources 425 of cloud computing environment 415.

Parking system 420 can include a server device or a group of server devices. In some implementations, parking system 420 can be hosted in cloud computing environment 415. Notably, while implementations described herein describe parking system 420 as being hosted in cloud computing environment 415, in some implementations, parking system 420 might not be cloud-based or can be partially cloud-based.

Cloud computing environment 415 includes an environment that delivers computing as a service, whereby shared resources, services, etc. can be provided to user device 410 and/or parking monitor 430. Cloud computing environment 415 can provide computation, software, data access, storage, and/or other services that do not require end-user knowledge of a physical location and configuration of a system and/or a device that delivers the services. As shown, cloud computing environment 415 can include parking system 420 and computing resource 425.

Computing resource 425 includes one or more personal computers, workstation computers, server devices, or another type of computation and/or communication device. In some implementations, computing resource 425 can host parking system 420. The cloud resources can include compute instances executing in computing resource 425, storage devices provided in computing resource 425, data transfer devices provided by computing resource 425, etc. In some implementations, computing resource 425 can communicate with other computing resources 425 via wired connections, wireless connections, or a combination of wired and wireless connections.

As further shown in FIG. 4, computing resource 425 can include a group of cloud resources, such as one or more applications ("APPs") 425-1, one or more virtual machines ("VMs") 425-2, virtualized storage ("VSs") 425-3, one or more hypervisors ("HYPs") 425-4, or the like.

Application 425-1 includes one or more software applications that can be provided to or accessed by user device 410. Application 425-1 can eliminate a need to install and execute the software applications on user device 410. For example, application 425-1 can include software associated with parking system 420 and/or any other software capable of being provided via cloud computing environment 415. In some implementations, one application 425-1 can send/receive information to/from one or more other applications 425-1, via virtual machine 425-2.

Virtual machine 425-2 includes a software implementation of a machine (e.g., a computer) that executes programs like a physical machine. Virtual machine 425-2 can be either a system virtual machine or a process virtual machine, depending upon use and degree of correspondence to any real machine by virtual machine 425-2. A system virtual machine can provide a complete system platform that supports execution of a complete operating system ("OS"). A process virtual machine can execute a single program and can support a single process. In some implementations, virtual machine 425-2 can execute on behalf of a user (e.g., user device 410), and can manage infrastructure of cloud computing environment 415, such as data management, synchronization, or long-duration data transfers.

Virtualized storage 425-3 includes one or more storage systems and/or one or more devices that use virtualization techniques within the storage systems or devices of computing resource 425. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 425-4 provides hardware virtualization techniques that allow multiple operating systems (e.g., "guest operating systems") to execute concurrently on a host computer, such as computing resource 425. Hypervisor 425-4 can present a virtual operating platform to the guest operating systems and can manage the execution of the guest operating systems. Multiple instances of a variety of operating systems can share virtualized hardware resources.

Parking monitor 430 includes a system of one or more monitoring devices for monitoring a non-demarcated parking zone, determining characteristics of the non-demarcated parking zone, and/or providing information associated with the non-demarcated parking zone. For example, parking monitor 430 can include one or more cameras, sensors (e.g., radar sensors, motion sensors, pressure sensors, audio sensors, temperature sensors, and/or the like), security devices, and/or the like. Parking monitor 430 can provide, to parking system 420, images from cameras, sensor data from sensors, security information from security devices, and/or any other information related to a non-demarcated parking zone from any other monitoring devices.

Network 440 includes one or more wired and/or wireless networks. For example, network 440 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there can be additional devices and/or networks, fewer devices and/or networks, different devices and/or networks, or differently arranged devices and/or networks than those shown in FIG. 4. Furthermore, two or more devices shown in FIG. 4 can be implemented within a single device, or a single device shown in FIG. 4 can be implemented as multiple, distributed devices. Additionally, or alternatively, a set of devices (e.g., one or more devices) of environment 400 can perform one or more functions described as being performed by another set of devices of environment 400.

Figure 5:
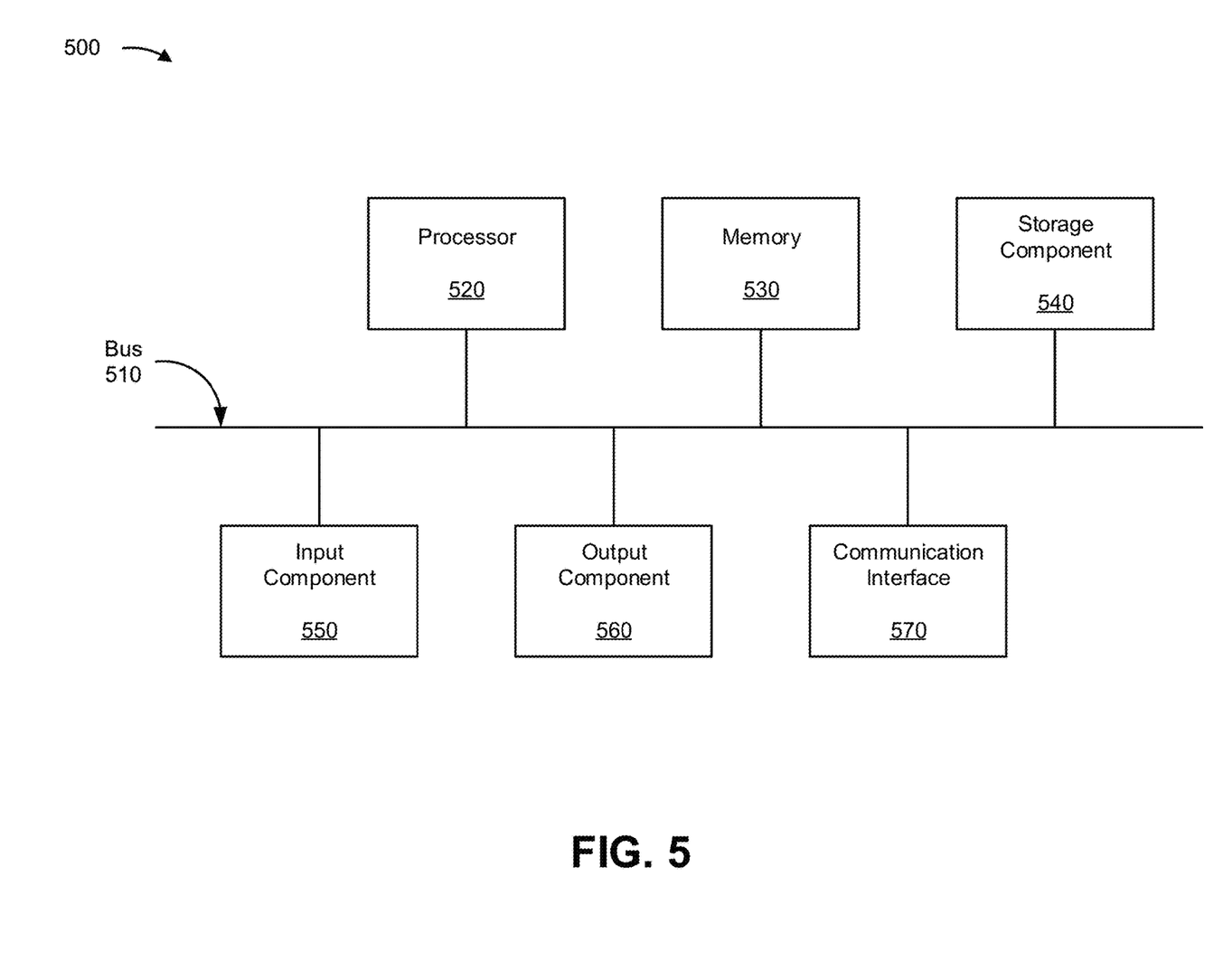
FIG. 5 is a diagram of example components of one or more devices of FIG. 4.

FIG. 5 is a diagram of example components of a device 500. Device 500 can correspond user device 410 and parking monitor 430. In some implementations, user device 410 and/or parking monitor 430 can include one or more devices 500 and/or one or more components of device 500. As shown in FIG. 3, device 500 can include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random-access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 can include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 can include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 can permit device 500 to receive information from another device and/or provide information to another device. For example, communication interface 570 can include an Ethernet interface, an optical interface, a coaxial interface, an infrared interface, a radio frequency (RF) interface, a universal serial bus (USB) interface, a wireless local area network interface, a cellular network interface, or the like.

Device 500 can perform one or more processes described herein. Device 500 can perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions can be read into memory 530 and/or storage component 540 from another computer-readable medium or from another device via communication interface 570. When executed, software instructions stored in memory 530 and/or storage component 540 can cause processor 520 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 can include additional components, fewer components, different components, or differently arranged components than those shown in FIG. 5. Additionally, or alternatively, a set of components (e.g., one or more components) of device 500 can perform one or more functions described as being performed by another set of components of device 500.

Figure 6:
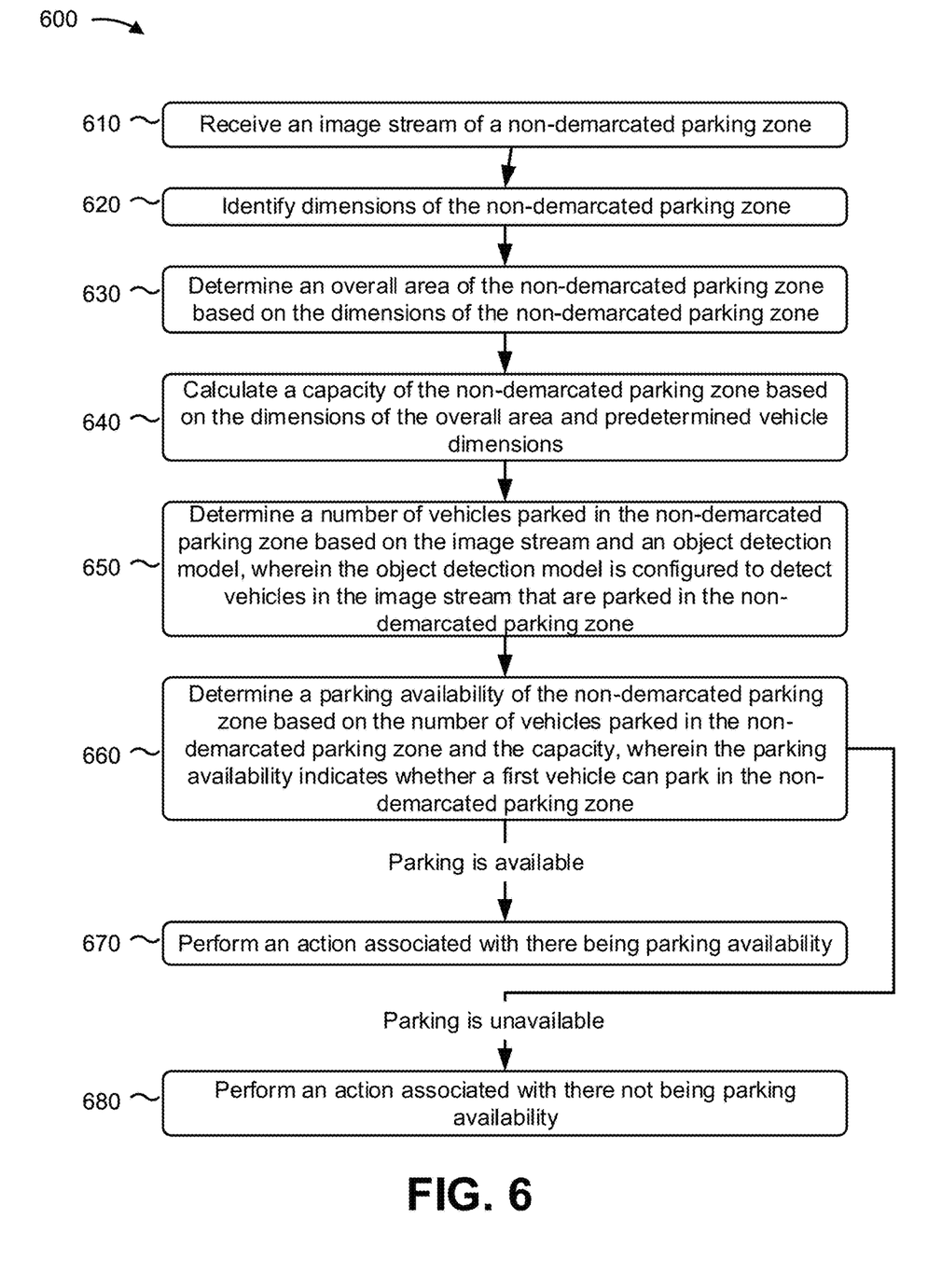
FIG. 6 is a flow chart of an example process associated with a parking availability monitor for a non-demarcated parking zone.

FIG. 6 is a flow chart of an example process 600 associated with a parking availability monitor for a non-demarcated parking zone. In some implementations, one or more process blocks of FIG. 6 can be performed by a parking system (e.g., parking system 420). In some implementations, one or more process blocks of FIG. 6 can be performed by another device or a group of devices separate from or including the parking system, such as a user device (e.g., user device 410), a parking monitor (e.g., parking monitor 430), and/or the like.

As shown in FIG. 6, process 600 can include receiving an image stream of a non-demarcated parking zone (block 610). For example, the parking system, (e.g., using computing resource 425, processor 520, memory 530, input component 550, communication interface 570, and/or the like) can receive an image stream of a non-demarcated parking zone, as described above.

As further shown in FIG. 6, process 600 can include identifying dimensions of the non-demarcated parking zone (block 620). For example, the parking system, (e.g., using computing resource 425, processor 520, memory 530, and/or the like) can identify dimensions of the non-demarcated parking zone, as described above.

As further shown in FIG. 6, process 600 can include determining an overall area of the non-demarcated parking zone based on the dimensions of the non-demarcated parking zone (block 630). For example, the parking system, (e.g., using computing resource 425, processor 520, memory 530, and/or the like) can determine an overall area of the non-demarcated parking zone based on the dimensions of the non-demarcated parking zone, as described above.

As further shown in FIG. 6, process 600 can include calculating a capacity of the non-demarcated parking zone based on the dimensions of the overall area and predetermined vehicle dimensions (block 640). For example, the parking system, (e.g., using computing resource 425, processor 520, memory 530, and/or the like) can calculate a capacity of the non-demarcated parking zone based on the dimensions of the overall area and predetermined vehicle dimensions, as described above.

As further shown in FIG. 6, process 600 can include determining a number of vehicles parked in the non-demarcated parking zone based on the image stream and an object detection model, wherein the object detection model is configured to detect vehicles in the image stream that are parked in the non-demarcated parking zone (block 650). For example, the parking system, (e.g., using computing resource 425, processor 520, memory 530, and/or the like) can determine a number of vehicles parked in the non-demarcated parking zone based on the image stream and an object detection model, as described above. In some implementations, the object detection model is configured to detect vehicles in the image stream that are parked in the non-demarcated parking zone.

As further shown in FIG. 6, process 600 can include determining a parking availability of the non-demarcated parking zone based on the number of vehicles parked in the non-demarcated parking zone and the capacity, wherein the parking availability indicates whether a first vehicle can park in the non-demarcated parking zone (block 660). For example, the parking system, (e.g., using computing resource 425, processor 520, memory 530, and/or the like) can determine a parking availability of the non-demarcated parking zone based on the number of vehicles parked in the non-demarcated parking zone and the capacity, as described above. In some implementations, the parking availability indicates whether a first vehicle can park in the non-demarcated parking zone.

As further shown in FIG. 6, process 600 can include performing an action associated with there being parking availability (block 670). For example, the parking system, (e.g., using computing resource 425, processor 520, memory 530, output component 560, communication interface 570, and/or the like) can perform an action associated with there being parking availability, as described above.

As further shown in FIG. 6, process 600 can include performing an action associated with there not being parking availability (block 680). For example, the parking system, (e.g., using computing resource 425, processor 520, memory 530, output component 560, communication interface 570, and/or the like) can perform an action associated with there not being parking availability, as described above.

Process 600 can include additional implementations, such as any single implementation or any combination of implementations described below and/or in connection with one or more other processes described elsewhere herein.

In some implementations, the parking system can analyze the image stream to determine respective positions of the number of vehicles parked within the non-demarcated parking zone and determine the parking availability based on a probability that the non-demarcated parking zone includes an open space to fit the first vehicle. In some implementations, the probability that the non-demarcated parking zone includes an open space to fit the first vehicle is determined based on based on the respective positions of the number of vehicles within and dimensions of the first vehicle.

In some implementations, the parking system can receive information identifying a time period during which the first vehicle is to park in the non-demarcated parking zone, analyze historical data associated with the parking availability of the non-demarcated parking zone during the time period, and estimate the parking availability for the time period based on the historical data, the number of vehicles parked in the non-demarcated parking zone, and the capacity.

In some implementations, the parking availability is determined using a machine learning model. In some implementations, the machine learning model is trained based on historical data associated with the parking availability of the non-demarcated parking zone and one or more parameters associated with the first vehicle. In some implementations, the one or more parameters include at least one of: a location of the first vehicle, an estimated amount of time of arrival of the first vehicle, a dimension of the first vehicle, or a type of the first vehicle.

In some implementations, the parking system can determine respective dimensions of a plurality of vehicles that have parked in the non-demarcated parking zone and calculate the predetermined vehicle dimensions based on an average of the respective dimensions of the plurality of vehicles that have parked in the non-demarcated parking zone.

In some implementations, the parking system, when performing the action, can, based on the parking availability indicating that the first vehicle can park in the non-demarcated parking zone, determine location information associated with an available parking space in the non-demarcated parking zone and provide the location information to a user device.

In some implementations, the parking system, when performing the action, can store the parking availability a data structure, present the parking availability in real-time on a display of a user device, or provide navigation information to the non-demarcated parking zone to a user device. In some implementations, the parking availability can be obtained from the data structure to determine a future parking availability for a time period.

Although FIG. 6 shows example blocks of process 600, in some implementations, process 600 can include additional blocks, fewer blocks, different blocks, or differently arranged blocks than those depicted in FIG. 6. Additionally, or alternatively, two or more of the blocks of process 600 can be performed in parallel.

The foregoing disclosure provides illustration and description but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface can include a graphical user interface, a non-graphical user interface, a text-based user interface, or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:

receiving, by a device, an image stream of a non-demarcated parking zone;

identifying, by the device, dimensions of the non-demarcated parking zone;

determining, by the device, an overall area of the non-demarcated parking zone based on the dimensions of the non-demarcated parking zone;

calculating, by the device, a capacity of the non-demarcated parking zone based on the dimensions of the overall area and predetermined vehicle dimensions;

determining, by the device, a number of vehicles parked in the non-demarcated parking zone based on the image stream and an object detection model,
  wherein the object detection model is configured to detect vehicles in the image stream that are parked in the non-demarcated parking zone;

determining, by the device, a parking availability of the non-demarcated parking zone based on the number of vehicles parked in the non-demarcated parking zone and the capacity,
  wherein the parking availability indicates whether a first vehicle can park in the non-demarcated parking zone; and performing, by the device, an action associated with the parking availability.

2. The method of claim 1, further comprising:

analyzing the image stream to determine respective positions of the number of vehicles parked within the non-demarcated parking zone; and determining the parking availability based on a probability that the non-demarcated parking zone includes an open space to fit the first vehicle,
  wherein the probability that the non-demarcated parking zone includes an open space to fit the first vehicle is determined based on the respective positions of the number of vehicles within and dimensions of the first vehicle.

3. The method of claim 1, further comprising:

receiving information identifying a time period during which the first vehicle is to park in the non-demarcated parking zone;

analyzing historical data associated with the parking availability of the non-demarcated parking zone during the time period; and estimating the parking availability for the time period based on the historical data, the number of vehicles parked in the non-demarcated parking zone, and the capacity.

4. The method of claim 1, wherein the parking availability is determined using a machine learning model,
  wherein the machine learning model is trained based on historical data associated with the parking availability of the non-demarcated parking zone and one or more parameters associated with the first vehicle,
    wherein the one or more parameters include at least one of:
      a location of the first vehicle,
      an estimated amount of time of arrival of the first vehicle,
      a dimension of the first vehicle, or
      a type of the first vehicle.

5. The method of claim 1, further comprising:

determining respective dimensions of a plurality of vehicles that have parked in the non-demarcated parking zone; and calculating the predetermined vehicle dimensions based on an average of the respective dimensions of the plurality of vehicles that have parked in the non-demarcated parking zone.

6. The method of claim 1, wherein performing the action comprises:

based on the parking availability indicating that the first vehicle can park in the non-demarcated parking zone, determining location information associated with an available parking space in the non-demarcated parking zone; and providing the location information to a user device.

7. The method of claim 1, wherein performing the action comprises at least one of:

storing the parking availability in a data structure,
  wherein the parking availability can be obtained from the data structure to determine a future parking availability for a time period;

presenting the parking availability in real-time on a display of a user device; or providing navigation information to the non-demarcated parking zone to a user device.

8. A device, comprising:

one or more memories; and one or more processors, communicatively coupled to the one or more memories, to:

receive an image stream of a non-demarcated parking zone;

identify dimensions of the non-demarcated parking zone;

determine an overall area of the non-demarcated parking zone based on the dimensions of the non-demarcated parking zone;

calculate a capacity of the non-demarcated parking zone based on the dimensions of the overall area and predetermined vehicle dimensions;

determine a number of vehicles parked in the non-demarcated parking zone based on the image stream and an object detection model,
  wherein the object detection model is configured to detect vehicles in the image stream that are parked in the non-demarcated parking zone;

determine a parking availability of the non-demarcated parking zone based on the number of vehicles parked in the non-demarcated parking zone and the capacity,
  wherein the parking availability indicates whether a first vehicle can park in the non-demarcated parking zone; and perform an action associated with the parking availability.

9. The device of claim 8, wherein the one or more processors are further to:

analyze the image stream to determine respective positions of the number of vehicles parked within the non-demarcated parking zone; and determine the parking availability based on a probability that the non-demarcated parking zone includes an open space to fit the first vehicle,
  wherein the probability that the non-demarcated parking zone includes an open space to fit the first vehicle is determined based on based on the respective positions of the number of vehicles within and dimensions of the first vehicle.

10. The device of claim 8, wherein the one or more processors are further to:

receive information identifying a time period during which the first vehicle is to park in the non-demarcated parking zone;

analyze historical data associated with the parking availability of the non-demarcated parking zone during the time period; and estimate the parking availability for the time period based on the historical data, the number of vehicles parked in the non-demarcated parking zone, and the capacity.

11. The device of claim 8, wherein the parking availability is determined using a machine learning model, wherein the machine learning model is trained based on historical data associated with the parking availability of the non-demarcated parking zone and one or more parameters associated with the first vehicle, wherein the one or more parameters include at least one of:
a location of the first vehicle,
an estimated amount of time of arrival of the first vehicle,
a dimension of the first vehicle, or
a type of the first vehicle.

12. The device of claim 8, wherein the one or more processors are further to:

determine respective dimensions of a plurality of vehicles that have parked in the non-demarcated parking zone; and calculate the predetermined vehicle dimensions based on an average of the respective dimensions of the plurality of vehicles that have parked in the non-demarcated parking zone.

13. The device of claim 8, wherein the one or more processors, when performing the action, are to:

based on the parking availability indicating that the first vehicle can park in the non-demarcated parking zone, determine location information associated with an available parking space in the non-demarcated parking zone; and provide the location information to a user device.

14. The device of claim 8, wherein the one or more processors, when performing the action, are to:

store the parking availability in a data structure,
wherein the parking availability can be obtained from the data structure to determine a future parking availability for a time period;
present the parking availability in real-time on a display of a user device; or
provide navigation information to the non-demarcated parking zone to a user device.

15. A non-transitory computer-readable medium storing instructions, the instructions comprising:

one or more instructions that, when executed by one or more processors, cause the one or more processors to:
receive an image stream of a non-demarcated parking zone;
identify dimensions of the non-demarcated parking zone;
determine an overall area of the non-demarcated parking zone based on the dimensions of the non-demarcated parking zone;
calculate a capacity of the non-demarcated parking zone based on the dimensions of the overall area and predetermined vehicle dimensions;
determine a number of vehicles parked in the non-demarcated parking zone based on the image stream and an object detection model,
wherein the object detection model is configured to detect vehicles in the image stream that are parked in the non-demarcated parking zone;
determine a parking availability of the non-demarcated parking zone based on the number of vehicles parked in the non-demarcated parking zone and the capacity
wherein the parking availability indicates whether a first vehicle can park in the non-demarcated parking zone; and
perform an action associated with the parking availability.

16. The non-transitory computer-readable medium of claim 15, wherein the one or more instructions, when executed by the one or more processors, further cause the one or more processors to:

analyze the image stream to determine respective positions of the number of vehicles parked within the non-demarcated parking zone; and determine the parking availability based on a probability that the non-demarcated parking zone includes an open space to fit the first vehicle,
wherein the probability that the non-demarcated parking zone includes an open space to fit the first vehicle is determined based on based on the respective positions of the number of vehicles within and dimensions of the first vehicle.

17. The non-transitory computer-readable medium of claim 15, wherein the one or more instructions, when executed by the one or more processors, further cause the one or more processors to:

receive information identifying a time period during which the first vehicle is to park in the non-demarcated parking zone;

analyze historical data associated with the parking availability of the non-demarcated parking zone during the time period; and estimate the parking availability for the time period based on the historical data, the number of vehicles parked in the non-demarcated parking zone, and the capacity.

18. The non-transitory computer-readable medium of claim 15, wherein the parking availability is determined using a machine learning model, wherein the machine learning model is trained based on historical data associated with the parking availability of the non-demarcated parking zone and one or more parameters associated with the first vehicle, wherein the one or more parameters include at least one of:
a location of the first vehicle,
an estimated amount of time of arrival of the first vehicle,
a dimension of the first vehicle, or
a type of the first vehicle.

19. The non-transitory computer-readable medium of claim 15, wherein the one or more instructions, when executed by the one or more processors, further cause the one or more processors to:

determine respective dimensions of a plurality of vehicles that have parked in the non-demarcated parking zone; and calculate the predetermined vehicle dimensions based on an average of the respective dimensions of the plurality of vehicles that have parked in the non-demarcated parking zone.

20. The non-transitory computer-readable medium of claim 15, wherein the one or more instructions, that cause the one or more processors to perform the action, cause the one or more processors to:
- based on the parking availability indicating that the first vehicle can park in the non-demarcated parking zone, determine location information associated with an available parking space in the non-demarcated parking zone; and
- provide the location information to a user device.

* * * * *